(12) United States Patent
Hedegaard

(10) Patent No.: US 7,476,321 B2
(45) Date of Patent: Jan. 13, 2009

(54) METHOD AND A PLANT FOR WASTE WATER TREATMENT

(75) Inventor: Henrik U. Hedegaard, Fakse (DK)

(73) Assignee: Biokube International A/S, Tappernoje (DK)

( * ) Notice: Subject to any disclaimer, the term of this patent is extended or adjusted under 35 U.S.C. 154(b) by 36 days.

(21) Appl. No.: 10/571,919

(22) PCT Filed: Sep. 15, 2004

(86) PCT No.: PCT/DK2004/000609

§ 371 (c)(1),
(2), (4) Date: Jan. 3, 2007

(87) PCT Pub. No.: WO2005/026064

PCT Pub. Date: Mar. 24, 2005

(65) Prior Publication Data

US 2007/0108124 A1    May 17, 2007

(30) Foreign Application Priority Data

Sep. 15, 2003    (DK) ........................ PA 2003 01333

(51) Int. Cl.
  *C02F 3/00*    (2006.01)
(52) U.S. Cl. ..................... 210/615; 210/620; 210/150; 210/197; 210/532.2; 210/220
(58) Field of Classification Search ......... 210/620–624, 210/615, 150–151, 197, 532.2, 220
See application file for complete search history.

(56) References Cited

U.S. PATENT DOCUMENTS

| 3,764,523 A | 10/1973 | Stankewich, Jr. |
| 4,183,809 A | 1/1980 | Klapwijk et al. |
| 4,210,528 A | 7/1980 | Coviello et al. |
| 5,232,596 A | 8/1993 | Castaldi |
| 6,210,578 B1 | 4/2001 | Sagastume et al. |
| 6,592,755 B1 | 7/2003 | Nurse, Jr. |
| 2002/0189173 A1* | 12/2002 | Staschik ................ 52/79.1 |
| 2003/0062321 A1 | 4/2003 | Kitayama et al. |
| 2003/0132148 A1 | 7/2003 | Okamoto et al. |

FOREIGN PATENT DOCUMENTS

| EP | 0 002 008 | 5/1979 |
| EP | 0 396 142 | 11/1990 |
| EP | 0 557 922 | 9/1993 |
| GB | 1 484 928 | 9/1977 |
| JP | 10-235104 | 9/1998 |
| WO | 03/020650 | 3/2003 |

* cited by examiner

Primary Examiner—Chester T Barry
(74) Attorney, Agent, or Firm—Jacobson Holman PLLC

(57) ABSTRACT

A method and a plant for waste water treatment include a method for purifying waste that has the steps of a) storing waste water; b) optionally removing phosphorous compounds; c) leading the waste water to a first aerated biodegrading zone; d) leading waste water from the first aerated biodegrading zone to a second aerated biodegrading zone to obtain purified water; and e) leading purified water to at least step a) or to step b) if step b) is present. Advantages of the method are that production of $H_2S$ is kept at a minimum, the necessary amount of chemicals used in phosphorous removal is reduced, an improved nitrification occurs, and the purification is improved during start up after a longer break.

19 Claims, 2 Drawing Sheets

METHOD AND A PLANT FOR WASTE WATER TREATMENT

CROSS-REFERENCE TO RELATED APPLICATION

This is a nationalization of PCT/DK2004/000609 filed 15 Sep. 2004 and published in English.

The present invention relates to an improved method for water purification and a plant for performing such purification.

BACKGROUND OF THE INVENTION

1. Field of the Invention

During the latest decade there has been an increased focus on the purification of waste water from urban and industrial activity prior to leading it back to nature.

Numerous private housings are not connection to public sewerage systems and their waste water is therefore not treated in a public purifying plant. Instead these housings rely on their individual solutions on the purification issue.

A common solution is in form of a septic tank in which an anaerobic fermentation process at low temperatures purifies the waste. This process however takes a significant time and the outflow is often discharged to some kind of percolation through the ground, e.g. a seepage pit, or through a drainage tube o the nearest lake or stream.

In Denmark alone over 300.000 housings only rely on a septic tank as waste water treatment.

Resent demands from the authorities force these housings to provide improved purification of their waste water. Among others there are focus on organic compounds, phosphorous compounds and nitrogen containing compounds.

The phosphorous compounds are often removed by an oxidative precipitation in which chemicals are added to the waste water and oxidize the phosphorous compounds to phosphates which are precipitated as sparingly soluble salts. The phosphorous compounds are normally either precipitated in a separate tank or in the septic tank or optionally in a compartment in the septic tank as disclosed in JP 1997 004 1289.

2. Description of the Related Art

Prior plants for purifying the waste water from one or more of the above mentioned compounds are described in the literature.

US 2003/0062321 A1 describes a plant in which water to be purified is supplied to a first anaerobic filter bed and from there to a second anaerobic filter bed. During these steps organic matter is decomposed anaerobically and nitrate being an oxygen source is converted into free nitrogen. From the second anaerobic filter bed the waste water is led to an aerobic filter bed in which organic nitrogen is converted biologically into nitrate. After precipitation water is then lead to disinfection and electrolytic de-nitrification or to electrolytic phosphorous removal. This process has the disadvantage that phosphorous compounds are not removed prior to introduction into the microbial zones, where it can influence the growth and purifying ability of the bacteria. Further the nitrification in the aerobic filter bed, being autotrophic, might be hampered by competition from faster growing heterotrophic bacteria thus resulting in incomplete conversion of nitrogen containing compounds. Still further there is no description on how to handle a possible problem with $H_2S$.

JP 10 235104 describes a phosphorous removing device which can be applied to different sections of a waste water purification plant. The phosphorous removing device may be provided in any section of a water purifying plant having two anaerobic sections and one aerobic section. In the illustrated case the phosphorous remover device is provided in the second anaerobic section. This construction has the disadvantage that excessive amount of phosphorous removing chemical has to be used, that the autotrophic bacteria do not have optimal growing conditions and that optionally present $H_2S$ is not removed.

U.S. Pat. No. 6,210,578 B1 discloses a water treatment plant to be used in series in connection with a septic pit. The water treatment plant has a plurality of aerated compartments having aerobic bacteria and two anaerobic compartments. Prior to the anaerobic compartments there a sedimentation compartment in which dense material settles. In this plant water is recycled from the anaerobic compartment to the sedimentation compartment. This provides improved flow through the system and allows for de-nitrification in the anaerobic compartments. Further it dilutes toxic compound to levels acceptable for the bacteria. This plant has the disadvantage that although it dilutes toxic compounds it does not prevent them from being generated. In case of holidays and a break of the supply of water to be treated a significant amount of $H_2S$ is generated in the septic pit and afterwards when the supply is resumed, and a flow through the system is generated, too much $H_2S$ to be sufficiently diluted enters the treatment plant. Thus the bacteria are killed and insufficient water treatment is provided resulting in outlet of unpurified water. Further this plant does not have an optimal phosphorous removal.

WO 03/02650 discloses a water treatment plant having two aerated sections and a stripping compartment prior to the aerated sections. The stripping compartment removes $H_2S$ from the waste water. This plant has some of the drawbacks described above. It does not inhibit $H_2S$ from being generated and it does not have optimal phosphorous removal.

The object of this invention is to provide a method and a plant which has improved phosphorous removal, which has improved start up performance after longer breaks and which limits the generation of $H_2S$.

SUMMARY OF THE INVENTION

In a first aspect the invention relates to a method for purifying waste water comprising the steps storing waste water; optionally removing phosphorous compounds; leading the waste water to a first aerated biodegrading zone; and leading waste water from the first aerated to a second aerated biodegrading zone to obtain purified water.

In a second aspect the invention relates to a purification plant comprising a septic tank, a first section with an aerated bio filter, a second section with an aerated bio filter and optionally a phosphorous precipitating unit.

In a third aspect the invention relates to the use of a purification unit in a method as described above, said purification unit comprising a first section with an aerated bio filter, a second section with an aerated bio filter.

DETAILED DESCRIPTION OF THE PRESENT INVENTION

Figure 1:
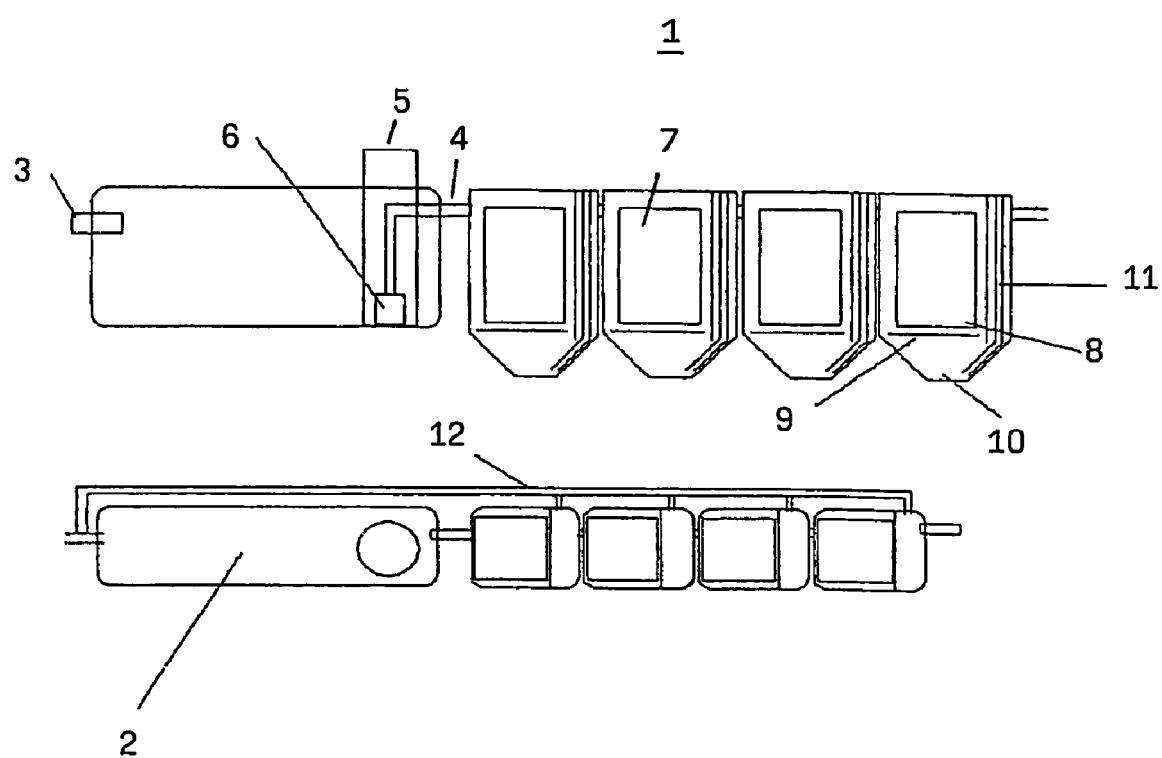
FIG. 1 shows a block diagram of one embodiment of a plant according to the invention.

According to the invention there is provided a method for purifying waste comprising the steps:
a) storing waste water
b) optionally removing phosphorous compounds
c) leading the waste water to a first aerated biodegrading zone
d) leading waste water from the first aerated to a second aerated biodegrading zone to obtain purified water
e) leading purified water to step a); or to step a) and/or step b) if step b) is present.

It has been found that the above described method has the advantage that production of $H_2S$ is kept at a minimum, that the necessary amount of chemicals used in phosphorous removal is reduced, that an improved nitrification occurs and that the purification is improved during start up after a longer break. These improvements will be described in further details in the following sections.

The waste water is suitably stored in a conventional septic tank.

Phosphorus compounds are preferably removed by adding an agent resulting in a precipitation of the phosphor.

It is preferred to ensure an even load of the plant by using an electronically controlled pump for controlling the stream of recycled water and/or sludge.

In accordance with a preferred embodiment of the invention the amount of phosphorous precipitating agent added is adjusted by talking into account the feed of phosphorous containing compounds and the amount of nitrate in the recycled purified water as nitrate acts as a donor for oxygen used in the removal of phosphorous compounds. The precipitating agent is preferably added to the recycled stream facilitating the control of the added amount and the mixing in the store.

Removal of phosphorous compounds is preferably performed in the septic tank even more preferred in a separate compartment in the septic tank.

It is preferred to strip the waste water for volatile components prior to the first aerated biodegrading zone. Examples of such volatile components are acetone, $H_2S$, chlorine, turpentine etc.

In a preferred embodiment the sludge is returned from the biodegrading zones to the septic tank by means of a pump, preferably a mammoth pump. Thus, sludge is removed from the biodegrading zones where it might block the water flow and held in the septic tank form which it is simple to remove the sludge, e.g. using a gully emptier.

It is preferred that the water is lead from one zone to the next by means of simple overflow.

In a preferred embodiment particles in water treated in a biodegrading zone is allowed to settle prior to entering the next biodegrading zone and/or leaving the process.

In an especially preferred embodiment the water flows though the biodegrading zone at such a rate that settlement occurs in the biodegrading zone. A suitable rate can be determined by first determining the averaged settle rate of the particles in the water and then adjusting the flow rate such that the water remains in the zone longer than it takes for an average particle to sink from the top of the zone to the bottom. The settlement can settle any desired fraction of the particles by adjusting the flow rate of water to settle rate for the desire fraction. However the feed to the bacteria has to be taken into account.

It is preferred that treated water is recycled to both phosphor removal and to the storing place e.g. the septic tank.

In an especially preferred embodiment of the invention the purified water from the second aerated biodegrading zone is lead to at least one further biodegrading zone so as to obtain further purified water. Preferably the number of further biodegrading zones in the range from 1-7, especially preferred is 1 or 2.

In another aspect, the invention relates to a method for purification of waste water wherein the waste water is subjected to a treatment in a first zone so as to precipitate phosphor, after which the waste water depleted of phosphor is passed successively through two aerated bio filters each in a tank to obtain a state in which the first bio filter mainly houses heterotrophic bacteria and the second bio filter mainly autotrophic bacteria the waste water from the second bio filter being discharged, which method is characterized in that the water from the second bio filter is partly recycled to the phosphor precipitation zone.

The invention is based on the discovery that it is possible, by recycling sludge and/or by time wise control of the flow of waste water through the plant, to counteract the above-mentioned problems in connection with variable waste water production in the household.

By control of the flow of waste water through the plant over the time, the waste water can be passed through the plant evenly distributed over the entire day and hereby provide optimal conditions for the microorganisms as the "day rhythm peaks" are neutralised. Better bacteria growth conditions result in better purification, which again gives a reduction of the over-capacity else necessary.

By removing sludge from the chambers several times over the day and passing it to the septic tank inlet, it is achieved that the plant is free of sludge and also that you will be "feeding" the plant as the amount of sludge/water removed will push a corresponding amount of water into the purification plant from the septic tank, irrespective of fluctuating supply of water to the plant and thus keep the processes running.

By recycling purified water rich in nitrate denitrification of the waste water in the septic tank, i.e. removal of nitrite and nitrate is obtained. Because of the presence of nitrate, a cheaper phosphorous precipitation is obtainable.

A preferred embodiment according to the invention is a method for the purification of waste water from small households, comprising:
collecting waste water in a septic tank
purification in minimum 2 sections, preferably minimum 3 sections, where each section has a submerged aerated filter and a sludge precipitation step, which method is characterized in that water and/or sludge are/is recycled from one or several sections and that the flow of waste water through the plant is optionally controlled.

In one preferred embodiment of the method the purification is carried using 3 to 5 sections, each comprising a primary chamber with a submerged bio filter and optionally a settling tank.

This method can be combined with any of the above described preferred embodiments.

The present invention relates to a method for biological purification of waste water and a plant for use in the method. In particular, the plant according to the invention is a small purification plant 5-500 EP of the type "submerged aerated bio filter plant", and is characterized in that the load on the plant can take place time wise proportionally, and/or that denitrification can take place in "symbiosis" with phosphorous precipitation, where a pre-precipitation tank (septic tank) participates in the process. In a preferred embodiment, the control of the process is constructed in such manner that the day load on the plant is distributed evenly over all the 24 hours of the day.

The entire process takes place in two or more, preferably three or more, more preferably four or more, most preferably four to seven, separate sections.

The present invention is based on the assumption that by arranging several sections in tandem you will obtain a much improved purification capability, because after having flown through a system, the waste water becomes purer in the outlet than in the inlet.

In a preferred embodiment of the purification plant, a small, preferably constant amount of water, preferably 3-7 times the aggregate day consumption of the household, is passed from the last chamber in the last section to the septic tank. As the water from the last chamber is very nitrate-containing, you will obtain a denitrification in the septic tank due to the anaerobic conditions and freely available carbon. In a still more preferred embodiment the backwash is added with a phosphorous precipitation chemical, for example PAX 14 from Kemira Miljø. The high redox number from the nitrate containing water improves the phosphorous precipitation, with resultant less consumption of chemicals. The precipitated phosphorous now stays in the septic tank, and does not therefore disturb the biological processes in the purification plant.

In a preferred embodiment the septic tank has two or more chambers, preferably 2-4, more preferably 3.

In an alternative embodiment, denitrification is performed in a separate unit.

It is, however, surprising and unexpected that by the method according to the invention, which differs from the known processes in comprising a time wise proportional load on the plant and a final denitrification and phosphorous precipitation step, outlet analysis results are obtained that are significantly below the requirements which the authorities place on far larger and much more advanced plants.

In a further aspect the invention relates to a plant for performing the method of the invention, e.g.: a plant comprising a septic tank, a first section with an aerated bio filter, a second section with an aerated bio filter and optionally a phosphorous precipitating unit which plant is characterized in that it has means for recycling purified water to the septic tank or, if a phosphorous precipitation unit is present, to either the septic tank or the phosphorous precipitation unit.

In one embodiment of the invention there is provided a purification plant comprising a septic tank succeeded by minimum 2 sections, preferably minimum 3 sections, each comprising a primary chamber with a submerged bio filter and optionally a settling tank, where the purification plant is characterized by having means for recycling water and/or sludge from one or more of the settling tanks to the septic tank, and by optionally having means for controlling the flow of waste water through the plant. The plant may comprise a septic tank and three to five aerated units which in sequence decompose organic material and ammonium/ammonia nitrogen. Additionally, a unit which denitrifies and removes phosphorous in the same work cycle.

In one embodiment of the invention the plant comprises from 3 to 5 sections, each comprising a primary chamber with a submerged bio filter and optionally a settling tank.

It is preferred that the purification comprises means for returning water from the last section suitably in an amount corresponding to the normal daily supply of waste water or more, preferably in an amount of from 3 to 7 times the normal daily supply of waste water. Such means may suitably be in the form of a pipe or a tube.

According to a particularly preferred embodiment, the plant in question is a small purification plant of the kind designated a submerged aerated bio filter plant, and which, in the preferred embodiment, has a capacity of between 5 and 500 person equivalents (PE). In such a plant, the biological portion is divided and separated from the nitrifying portion by a settling vessel, which entails a more stable purification process as the nitrifying bacteria so to speak get their own bio filter section after the organic material has been decomposed and the sludge has settled. The concentration of organic matter in the inlet of the succeeding chamber has been heavily reduced thereby. This entails considerably more stable conditions in the plant resulting in a more optimal and efficient purification.

The design of one preferred purification plant is shown in FIG. 1, from which it is seen that the plant consists of a septic tank and four similar, hooked up vessels. In each vessel there is a submerged bio filter. This bio filter is aerated by a diffuser mounted under the filter element. The diffuser at the same time ensures circulation of the waste water through the filter so that contact is established between the waste water and the bacteria on the filter skin. A settling tank collects the sludge from the biological processes. This sludge can be returned to the septic tank inlet by means of a pump system, preferably a mammoth pump.

The partially purified waste water is then passed on to the next chamber, and so on. The construction with preferably three to five chambers is dependant on spatial conditions. The plant can be built as a long and narrow plant, or as a shorter but broader plant. What are decisive for the purification capacity are the cubic content of the filter elements and the aeration.

In a preferred embodiment, a sub flow of the purified waste water present in the last sludge precipitation vessel is passed back to the septic tank inlet. To this sub flow is added phosphorous precipitation chemicals, and now simultaneous denitrification and phosphorous precipitation take place in the septic tank.

The waste water, now purified, is then, via an outlet, conducted to the recipient.

The embodiment shown in the figure is composed of several separate units that can be built together, and each of them being separately replaceable. With this embodiment it becomes possible, in a simple and easy way, to replace individual parts of the plant, or to extend it, should the need arise, for example, for increased capacity in the form of more PF. The advantages of this are evident.

Each individual vessel in the plant may be made of plastic, metal, glass fibre, concrete, or other materials. A typical volume of a vessel or a section for use in connection with the preferred small plant will lie between 400 liters and 25 m$^3$. The interior of the vessel or section is, by means of a partitioning wall which does not reach as far as to the bottom of the vessel, divided into a purification portion and a settling portion. A diffuser, or other air distributing unit distributing the air provided in the waste water content of the vessel, is positioned under the filter element.

Typically, the diffuser gives off an amount of air of between 10 and 100 liters of air per 100 liters of vessel volume.

In a preferred embodiment a phosphorous precipitation unit is included in the septic tank, and it is preferred to use in the phosphorous precipitation unit an oxidizing and/or precipitation agent.

In a preferred embodiment the plant has means for controlling the amount the oxidizing agent added to the phosphorous precipitating unit taking into account the content of nitrate in the recycled purified water.

It is preferred that the plant has means for recycling sludge precipitated in or after the bio sections to the septic tank. Preferably said means are in form of a pump, more preferably a mammoth pump.

In a preferred embodiment the plant further comprises a controlling unit for controlling the amount and/or intervals of recycling treated water to septic tank and/or the phosphorous precipitating unit, thus allowing optimal running of the plant. Thus it is secured as described in further details below that the $H_2S$ does not accumulate and the bacteria are not starved. The advantage of such a control is also, that the treatment of waste water is extended to essentially 24 hours a day in stead of only the hours where water is lead to the plant e.g. in the morning and in the evening.

It is preferred that a section with the bio filters is followed by a settling unit for settling particles in the water. In an especially preferred embodiment the settling unit is an integral part of the section and most preferably the settling is ensured by having sections with the bio filters dimensioned such that the residence time of water in the section is longer than the time used for a pre-determined fraction e.g. ½, ⅔, ¾, ⅘, 9/10 or 99/100 of the solid matter to sink from the top to the bottom of the section.

In a preferred embodiment the plant further comprises a stripping unit located upstream to the sections with the bio filters.

In another preferred embodiment the plant comprises further sections each provided with an aerated bio filter for obtaining further purified water. Preferably the number of further sections is in the range from 1-7, especially preferred 1 or 2.

In an especially preferred embodiment the precipitation of phosphorous compounds is carried out in the septic tank itself thus removing the phosphorous compounds without using an individual phosphorous precipitating unit.

It is preferred to use a bio filter which is not blocked or which does not reduce efficacy when the bacteria grow thereon as in case of using pipes or tubings. Suitable filter materials are e.g. tubes spun from plastic strings or filter materials available as Bioblok filter materials. In a preferred embodiment the bio filter used in the present invention is a Bioblok filter such as Bioblok 100 having a surface area of 100 $m^2/m^3$ or a Bioblok 150 having a surface area of 150 $m^2/m^3$.

Preferably the plant has means for removing precipitated matter from the first and the second section In a further aspect of the invention relates to the use of a purification unit in a method as described above, said purification unit comprising a first section with an aerated bio filter, a second section with an aerated bio filter, said purification unit has recycling means for recycling purified water a septic tank or to a phosphorous precipitation unit.

In a preferred embodiment the purification unit has one or more of the preferred features of the plant.

In a preferred embodiment the purification unit is in form of a separate unit which can be connected to an already existing septic tank or a continuation of an already positioned purification unit.

In general such purification methods use the principle of overflow when introducing material from section to section in the plant. This means that when material is added in a position upstream then material will flow from this section and through the following sections. Therefore is in cases when the feed of waste water to the septic tank halted for some time for example during a holiday period of 14 days there will no flow through the system.

Such periods influence the purification process in various ways. For example the waste water stored in the septic tank may begin to ferment. During such fermentation significant amount of $H_2S$ is generated in the septic tank and when new feed is added to the septic tank then stream reaching the biological section is rich in $H_2S$. If this problem is not addressed the bacteria are poisoned and dies resulting in that the waste water is not purified.

Further during these periods no feed is supplied to the bacteria and depending on the length of the break the bacteria dies from starvation. This reduction of the bacteria flora gives a reduced capacity of the method/plant after such a break. The reduced capacity then has the consequence that some waste water flow untreated through the system because there are not enough bacteria to eat the waste, resulting in discharging of insufficiently purified water.

However both these problems can be solved by recycling purified water from any of the biological section, preferably the last, to the septic tank. This recycling can be continuous or intermittent and happens both during normal run and during breaks in the waste water feed. The recycling procedure optionally can vary depending on the operating condition e.g. the purified water can be recycled in on manner during normal run and in a second manner during breaks.

Recycling to the septic tank of this purified water often being rich in nitrate generates a flow of material from the septic tank though the purification sections of the plant. Hereby the bacteria can be fed for a longer period resulting in the possibility for longer breaks without reduction of purifying capacity during start up.

Further this flow of water though the system during break prohibits the fermentation process and therefore $H_2S$ is generated to a far less degree not above toxic levels. Therefore there is no risk that the bacteria die during start up.

Phosphorous removal is preferably performed by oxidizing phosphorous compounds to phosphate and the precipitate phosphate as a poorly soluble salt. The oxidizing agent is an extern agent added to the system. Water from the nitrification zone is rich in nitrate which is an oxidizing agent and by recycling purified water to the phosphorous removing step the amount of extern agent can be reducing. This lowering of the amount of extern oxidizing agent is allowed because the nitrate takes part in the process. A positive side effect of the use of nitrate as oxidizing agent is that some of the nitrate is reduced to nitrogen which overall resulting in a reduction in the amount of nitrate discharged into the surroundings.

By using two or more sections with aerated bio filters it is secured that the bacteria essentially separates a heterotrophic section and an autotrophic section. The heterotrophic bacteria grows faster than the autotrophic bacteria and if they zones are not separated there is a risk, that the autotrophic bacteria is suppressed resulting in that the nitrification does not occur and thereby insufficient purification of the water. Further if the nitrification does not take place the advantage of using the nitrate in the phosphorous removal is not possible due to lack of nitrate.

DETAILED DESCRIPTION OF THE PREFERRED EMBODIMENTS

The invention is now described more in detail with reference to the drawings showing preferred embodiments of the invention.

FIG. 1 shows a plant (1) for performing the method described above. The plant (1) has a septic tank (2), having an inlet (3) and an outlet (4). In the septic tank (2) a pumping well (5) is provided. The pumping well has a pump (6) and the pumping well functions as following: water to be purified flow from a compartment in the septic tank into the pumping well thus allowing heavy components in the water to be purified to settle in the septic tank; the pump (6) then pumps the water from the pumping well (5) to the sections containing aerated biofilters. In this embodiment there are four sections (7) each having an aerated bio filter (8), a diffuser (9) and an integrated sludge settlement cone (10). The diffuser (9) provides the air for the bacteria sitting on the bio filter (8). A mammoth pump (11) recycles settles sludge to the inlet (3) of the septic tank (2) through a connection pipe (12). A further pipe (not shown) recycles the purified water to the septic tank (2).

Figure 2:
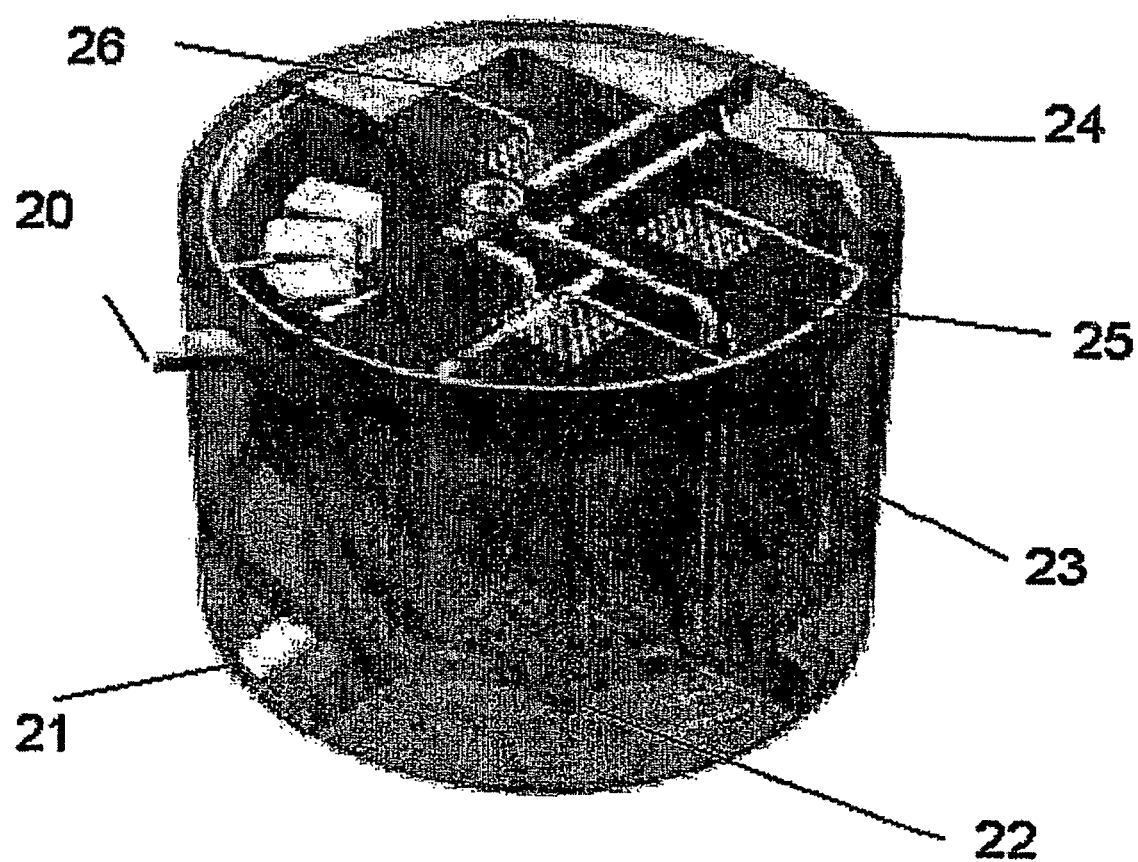
FIG. 2 shows an embodiment of a purification unit according to the invention.

FIG. 2 shows an embodiment of a purification unit according to the invention having an inlet (20) and an outlet (21). A part of the stream from the outlet can be recycled to the phosphorous removing unit and/or to the septic tank. In this embodiment there are three sections (27) each having an aerated bio filter (23) and a diffuser (22). Sludge produce by the bacteria settles in the bottom (28) and further settlement of particles happens in a settlement zone (24). In this embodiment there is a settlement zone adjacent to each of the sections. The water flows from section to section via overflow. The overflow is introduced to the next section via a pipe (25) which introduces the water in the bottom of the next section. Alternatively the water could be introduced in the top and removed at the bottom. The diffuser (22) gets its supply of air through a pipe (26) said pipe being connected to a compressor.

Example 1

In this example an embodiment of the invention was tested

| Day No. | pH | COD mg/litre | $NH_4$ mg/litre | $NO_3$ mg/litre | $NO_2$ mg/litre | $P_{tot}$ mg/litre |
|---|---|---|---|---|---|---|
| 1 | 7.1 | 29.6 | 0.145 | 29.6 | 0.759 | 2.27 |
| 12 | 7.63 | 23.9 | 0.114 | 20.3 | 0.444 | 0.758 |
| 27 | 7.35 | 24.6 | 0.218 | 14.6 | 0.253 | 0.746 |
| 40 | 7.27 | 20.3 | 0.127 | 12.8 | 0.346 | 0.634 |
| 55 | 7.63 | 22.8 | 0.102 | 10.6 | 0.295 | 0.538 |
| 72 | 7.48 | 20.7 | 0.095 | 10.2 | 0.372 | 0.521 |
| 84 | 7.35 | 22.7 | 0.184 | 11.9 | 0.329 | 0.627 |
| 101 | 7.29 | 21.9 | 0.137 | 11.2 | 0.284 | 0.573 |
| 118 | 7.17 | 20.5 | 0.132 | 10.5 | 0.294 | 0.472 |
| 133 | 7.3 | 22.9 | 0.118 | 10.2 | 0.312 | 0.529 |

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A method for purifying waste water comprising subjecting the waste water to a treatment in a first zone so as to precipitate phosphorus in a septic tank, after which the waste water depleted of the phosphorus is passed successively through two aerated bio filters each in a tank forming separate zones to obtain a state in which the first bio filter mainly houses heterotrophic bacteria and the second bio filter mainly houses autotrophic bacteria, and discharging the waste water from the second bio filter, a constant amount of the water rich in nitrate from the second aerated bio filter being partly recycled to the phosphorus precipitation zone and a sludge precipitated from at least one of in and after the bio filters being recycled to the septic tank such that the treatment of a load of the waste water is extended to essentially 24 hours a day.

2. The method as claimed in claim 1 comprising collecting the waste water in the septic tank and purifying the water in a minimum of two sections, each of the sections providing for sludge precipitation and having a submerged aerated filter, at least one of the water and the sludge being recycled from at least one of the sections.

3. The method as claimed in claim 1 wherein an even load of the plant is ensured using an electronically controlled pump.

4. The method as claimed in claim 2 wherein denitrification and precipitation of phosphorus are carried out in the septic tank using a return flow from the last sludge precipitation step.

5. The method as claimed in claim 4 wherein a phosphorus precipitation is added to the return flow.

6. The method as claimed in claim 5, wherein an added amount of a phosphorus precipitating agent is adjusted by taking into account a feed amount of phosphorus containing compounds and an amount of nitrate in the recycled purified water.

7. The method as claimed in claim 2 wherein the returned sludge is used to push waste water from the septic tank to the purification sections.

8. The method as claimed in claim 1 wherein an amount of the recycled water corresponds to a normal daily supply of waste water.

9. A purification plant comprising a septic tank, a first section with an aerated bio filter, a second section with an aerated bio filter, said sections forming separate zones to obtain a state in which the first bio filter mainly houses heterotrophic bacteria and the second bio filter mainly houses autotrophic bacteria, and a recycling system for recycling purified water rich in nitrate and a system for recycling sludge precipitated from at least one of in and after the bio filters to the septic tank.

10. The purification plant as claimed in claim 9, wherein the plant includes a septic tank succeeded by a minimum of two sections each including a primary chamber with a submerged bio filter, said sections forming separate zones and a settling tank, and a system for recycling at least one of water rich in nitrate and sludge from at least one of the settling tanks to the septic tank.

11. The purification plant as claimed in claim 10, wherein the septic tank is succeeded by from three to five sections, each including the primary chamber with the submerged bio filter and the settling tank.

12. The purification plant as claimed in claim 10, further comprising a system for returning the water from a last of the sections.

13. The purification plant as claimed in claim 10, further comprising a device for dispensing an agent for precipitating phosphorus.

14. A purification unit for purifying waste water, said purification unit comprising a first section with an aerated bio filter, a second section with an aerated bio filter, said sections forming separate zones to obtain a state in which the first bio filter mainly houses heterotrophic bacteria and the second bio filter mainly houses autotrophic bacteria, said purification unit having a recycling system for recycling purified water and a system for recycling sludge precipitated from at least one of in and after the bio filters to at least one of a septic tank and a phosphorus precipitation unit.

15. The method according to claim 2, wherein the step of purifying is performed in three sections.

16. The method according to claim 2, further comprising a step of controlling a flow of the waste water through the plant.

17. The purification plant according to claim 9, further comprising a phosphorus precipitating unit, with the purified water and the sludge being recycled to at least one of the septic tank and the phosphorus precipitating unit.

18. The purification plant according to claim 10, wherein the septic tank is succeeded by three of the sections.

19. The purification plant according to claim 10, further comprising a system for controlling a flow of the waste water through the plant.

* * * * *